(12) United States Patent
Porat et al.

(10) Patent No.: US 7,752,340 B1
(45) Date of Patent: Jul. 6, 2010

(54) ATOMIC COMMAND RETRY IN A DATA STORAGE SYSTEM

(75) Inventors: Ofer Porat, Westborough, MA (US); Armen Avakian, Natick, MA (US); Michael Daigle, Framingham, MA (US); Paul Scharlach, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 363 days.

(21) Appl. No.: 11/395,621

(22) Filed: Mar. 31, 2006

(51) Int. Cl.
*G06F 3/00* (2006.01)
(52) U.S. Cl. .............................. 710/5; 714/18; 714/748
(58) Field of Classification Search ....................... 710/5
See application file for complete search history.

(56) References Cited

U.S. PATENT DOCUMENTS

| | | | | |
|---|---|---|---|---|
| 4,845,614 A | * | 7/1989 | Hanawa et al. ................ 714/16 |
| 5,218,678 A | * | 6/1993 | Kelleher et al. ............... 710/5 |
| 5,497,461 A | * | 3/1996 | Matsumoto et al. ........... 714/51 |
| 5,530,893 A | * | 6/1996 | Sugi ............................. 710/5 |
| 5,564,014 A | * | 10/1996 | Yamashita et al. ............ 714/17 |
| 6,728,855 B2 | * | 4/2004 | Thiesfeld et al. ............. 711/170 |
| 2005/0027894 A1 | * | 2/2005 | Ayyavu et al. ................ 710/5 |

\* cited by examiner

*Primary Examiner*—Henry W. H. Tsai
*Assistant Examiner*—Elias Mamo
(74) *Attorney, Agent, or Firm*—Krishnendu Gupta; Scott A. Ouellette

(57) ABSTRACT

A data transfer retry method includes:
A. receiving a particular atomic data transfer command from a director;
B. processing identification information associated with the particular atomic data transfer command;
C. comparing the identification information associated with the particular atomic data transfer command to identification information of a previous atomic data transfer command received from the director;
D. determining that the particular atomic data transfer command is a retry command of the previous atomic data transfer command received from the director;
E. determining a status of the execution of the previous atomic data transfer command received from the director; and
F. processing the particular atomic data transfer command based on the status of the execution of the previous atomic data transfer command determined in Step E.

16 Claims, 4 Drawing Sheets

ATOMIC COMMAND RETRY IN A DATA STORAGE SYSTEM

FIELD OF THE INVENTION

The present invention is generally directed to atomic command retry in a data storage system, and more particularly to a method and system in which all failed data transfer commands, including atomic commands, between a host and memory of the data storage system are retried.

BACKGROUND OF THE INVENTION

Network computer systems generally include a plurality of geographically separated or distributed computer nodes that are configured to communicate with each other via, and are interconnected by, one or more network communications media. One conventional type of network computer system includes a network storage subsystem that is configured to provide a centralized location in the network at which to store, and from which to retrieve data. Advantageously, by using such a storage subsystem in the network, many of the network's data storage management and control functions may be centralized at the subsystem, instead of being distributed among the network nodes.

One type of conventional network storage subsystem, manufactured and sold by the Assignee of the subject application (hereinafter "Assignee") under the trademark Symmetrix® (hereinafter referred to as the "Assignee's conventional storage system"), includes a plurality of disk mass storage devices configured as one or more redundant arrays of independent (or inexpensive) disks (RAID). The disk devices are controlled by disk controllers (commonly referred to as "back-end" I/O controllers/directors) that may store user data in, and retrieve user data from a shared cache memory resource in the subsystem. A plurality of host controllers (commonly referred to as "front-end" I/O controllers/directors) also may store user data in and retrieve user data from the shared cache memory resource. The disk controllers are coupled to respective disk adapters that, among other things, interface the disk controllers to the disk devices. Similarly, the host controllers are coupled to respective host channel adapters that, among other things, interface the host controllers via channel input/output (I/O) ports to the network communications channels (e.g., SCSI, Enterprise Systems Connection (ESCON), and/or Fibre Channel (FC) based communications channels) that couple the storage subsystem to computer nodes in the computer network external to the subsystem (commonly termed "host" computer nodes or "hosts").

In the Assignee's conventional storage system, the shared cache memory resource may comprise a plurality of memory circuit boards that may be coupled to an electrical backplane in the storage system. The cache memory resource is a semiconductor memory, as distinguished from the disk storage devices also comprised in the Assignee's conventional storage system, and each of the memory boards comprising the cache memory resource may be populated with, among other things, relatively high-speed synchronous dynamic random access memory (SDRAM) integrated circuit (IC) devices for storing the user data. The shared cache memory resource may be segmented into a multiplicity of cache memory regions. Each of the regions may, in turn, be segmented into a plurality of memory segments.

An exemplary data storage system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention (hereinafter, the "'939 patent").

As described in the '939 patent, the interface may also include, in addition to the host computer/server controllers (or directors) and disk controllers (or directors), addressable cache memories. The cache memory is a semiconductor memory and is provided to rapidly store data from the host computer/server before storage in the disk drives, and, on the other hand, store data from the disk drives prior to being sent to the host computer/server. The cache memory being a semiconductor memory, as distinguished from a magnetic memory as in the case of the disk drives, is much faster than the disk drives in reading and writing data.

The host computer/server controllers, disk controllers and cache memory are interconnected through a backplane printed circuit board. More particularly, disk controllers are mounted on disk controller printed circuit boards. The host computer/server controllers are mounted on host computer/server controller printed circuit boards. And, cache memories are mounted on cache memory printed circuit boards. The disk directors, host computer/server directors, and cache memory printed circuit boards plug into the backplane printed circuit board. In order to provide data integrity in case of a failure in a director, the backplane printed circuit board has a pair of buses. One set the disk directors is connected to one bus and another set of the disk directors is connected to the other bus. Likewise, one set the host computer/server directors is connected to one bus and another set of the host computer/server directors is directors connected to the other bus. The cache memories are connected to both buses. Each one of the buses provides data, address and control information.

The arrangement is shown schematically in FIG. 1 of U.S. Pat. No. 6,636,933, entitled "Data Storage System Having Crossbar Switch With Multi-Staged Routing," issued Oct. 21, 2003, and assigned to the same assignee as the present invention (hereinafter, the "'933 patent"), which patent is incorporated herein in its entirety. Thus, the use of two buses B1, B2 provides a degree of redundancy to protect against a total system failure in the event that the controllers or disk drives connected to one bus, fail. Further, the use of two buses increases the data transfer bandwidth of the system compared to a system having a single bus. Thus, in operation, when the host computer/server 12 wishes to store data, the host computer 12 issues a write request to one of the front-end directors 14 (i.e., host computer/server directors) to perform a write command. One of the front-end directors 14 replies to the request and asks the host computer 12 for the data. After the request has passed to the requesting one of the front-end directors 14, the director 14 determines the size of the data and reserves space in the cache memory 18 to store the request. The front-end director 14 then produces control signals on one of the address memory busses B1, B2 connected to such front-end director 14 to enable the transfer to the cache memory 18. The host computer/server 12 then transfers the data to the front-end director 14. The front-end director 14 then advises the host computer/server 12 that the transfer is complete. The front-end director 14 looks up in a Table, not shown, stored in the cache memory 18 to determine which one of the back-end directors 20 (i.e., disk directors) is to handle this request. The Table maps the host computer/server 12 addresses into an address in the bank 14 of disk drives. The front-end director 14 then puts a notification in a "mail box" (not shown and stored in the cache memory 18) for the back-end director 20, which is to handle the request, the amount of the data and the disk address for the data. Other back-end directors 20 poll the cache memory 18 when they are idle to check their "mail boxes". If the polled "mail box" indicates a transfer is to be made, the back-end director 20 processes the request, addresses the disk drive in the bank 22, reads the data from the cache memory 18 and writes it into the addresses of a disk drive in the bank 22.

Further described in the '933 patent is the use of a crossbar switch for connecting the data pipe of each director to the cache memory. As shown in FIGS. 8A and 8B, particularly, each crossbar switch device 318 is coupled to an associated data pipe 180, which is part of the director of the system (not shown), on its respective director board. The crossbar switch receives data read and write commands from the host 121 through the data pipe 180. Based on the type of command and the destination of the read/write instructions, the crossbar switch directs the command and data, if the command is a write command, to the appropriate cache memory board via the appropriate output port of the crossbar switch. Each output port of the crossbar switch is coupled to a logic network 221, or region controller, on the memory board 220. The region controller operates to transmit commands received from the crossbar switch to the appropriate memory array on the memory board 220.

SUMMARY OF THE INVENTION

The present invention is directed to the retry of data transfer commands, including atomic commands, such as read-modify-write commands. The invention includes a region controller that monitors the status of all data transfer commands received from the directors. In the case of read commands and write commands, if a link error is detected by the region controller, an error signal is sent to the director that issued the command, which instructs the director to retry the data transfer associated with the original command. In the case of a link error during an atomic command, the region controller saves the tag associated with the command and the completion status of the command when the error occurred. The region controller then instructs the director to retry the command. Upon receiving the next command, if it is determined to be an atomic command, the region controller compares the tag associated with the command with the tag saved from the failed command. If the tags are different, meaning that the latter command is not the retry of the former command, the region controller process the latter command normally.

However, if the tag of the latter command is the same as the tag of the former, saved tag, the region controller identifies the latter command as the retry of the former command. In this case, the region controller checks the completion status of the command former command. If the execution of the former command was never started, the region controller will issue the latter command to the memory array for execution and it will transmit a command completion instruction to the director that sent the command. If the execution of the former command was completed, the region controller does not issue the latter command to the to the memory array, but does transmit a command completion instruction to the director that sent the command. Finally, if the execution of the former command was started, but not completed, the region controller will not issue the latter command to the memory array for execution and it will transmit a error instruction to the director that sent the command, to notify the director that an error occurred during the execution of the command. In the third instance, the latter command will not be issued to the memory array because it was begun but not completed. This means that, during the read-modify-write command, some of the data may have been incompletely modified and written back to the memory location. If the latter command were to be issued to the memory array, the data at the memory location to which the command is directed may not be the data expected to be there, and a further manipulation of that data will cause further errors.

BRIEF DESCRIPTION OF THE DRAWINGS

These and other features of the invention will become more readily apparent from the following detailed description when read together with the accompanying drawings, in which.

DETAILED DESCRIPTION

Figure 1:
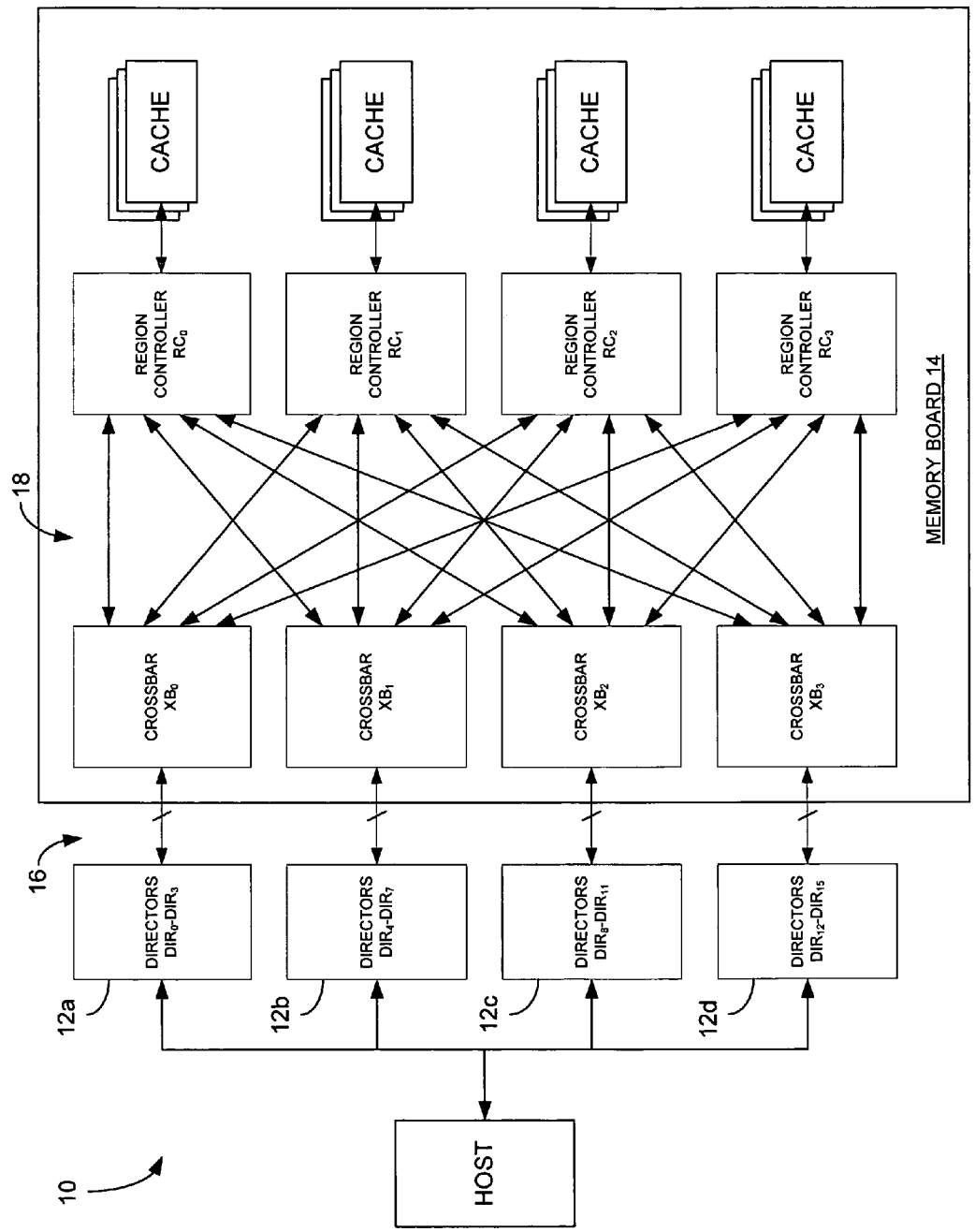
FIG. 1 is a schematic block diagram of the directors and the memory board which utilizes the atomic data transfer command retry operation in accordance with the present invention.

FIG. 1 is a schematic block diagram of the data command transmission system 10 of the present invention. As shown in the figure, the system 10 includes a plurality of director groups 12a-12d and a memory board 14. Similar to the system of the '933 patent, director groups 12a-12d include directors $DIR_0$-$DIR_3$; $DIR_4$-$DIR_7$; $DIR_8$-$DIR_{11}$; and $DIR_9$-$DIR_{12}$, respectively, that are coupled to crossbar switches $XB_0$, $XB_1$, $XB_2$ and $XB_3$, respectively, via UM/XB link 16. Memory board 14 also includes region controllers $RC_0$, $RC_1$, $RC_2$ and $RC_3$, each of which being coupled to a respective cache region. Each of the crossbar switches $XB_0$, $XB_1$, $XB_2$ and $XB_3$ are coupled to each of the region controllers $RC_0$, $RC_1$, $RC_2$ and $RC_3$ via XB/RC link 18. The directors 12a-12d of system 10 may be either a front-end directors or a back-end directors.

In operation, the host will send a data transfer command to one of the directors, which will transmit the command to its associated crossbar via the UM/XB link 16. The crossbar will route the command to the appropriate region controller via the XB/RC link 18. The region controller, based on the type of command and address associated with the command, will then either read data from one of the cache regions, in the case of a read command, write data to one of the cache regions, in the case of a write command, or read data from one of the cache regions, modify it, and write it back into the same address location, in the case of an atomic, or "read-modify-write" command. When the transaction is completed, i.e., the data intended to be read has been read or the data intended to be written has been written, the crossbar will send a status signal to the director to signify the completion of the transaction. As is described in more detail below, the director stores each command in a retry mechanism buffer until the status signal received from the crossbar signifies the completion of the transaction. If the status signal transmitted from the crossbar to the director indicates that an error in the transaction has occurred, the director will retry the transaction by retransmitting the command to the crossbar.

Figure 2:
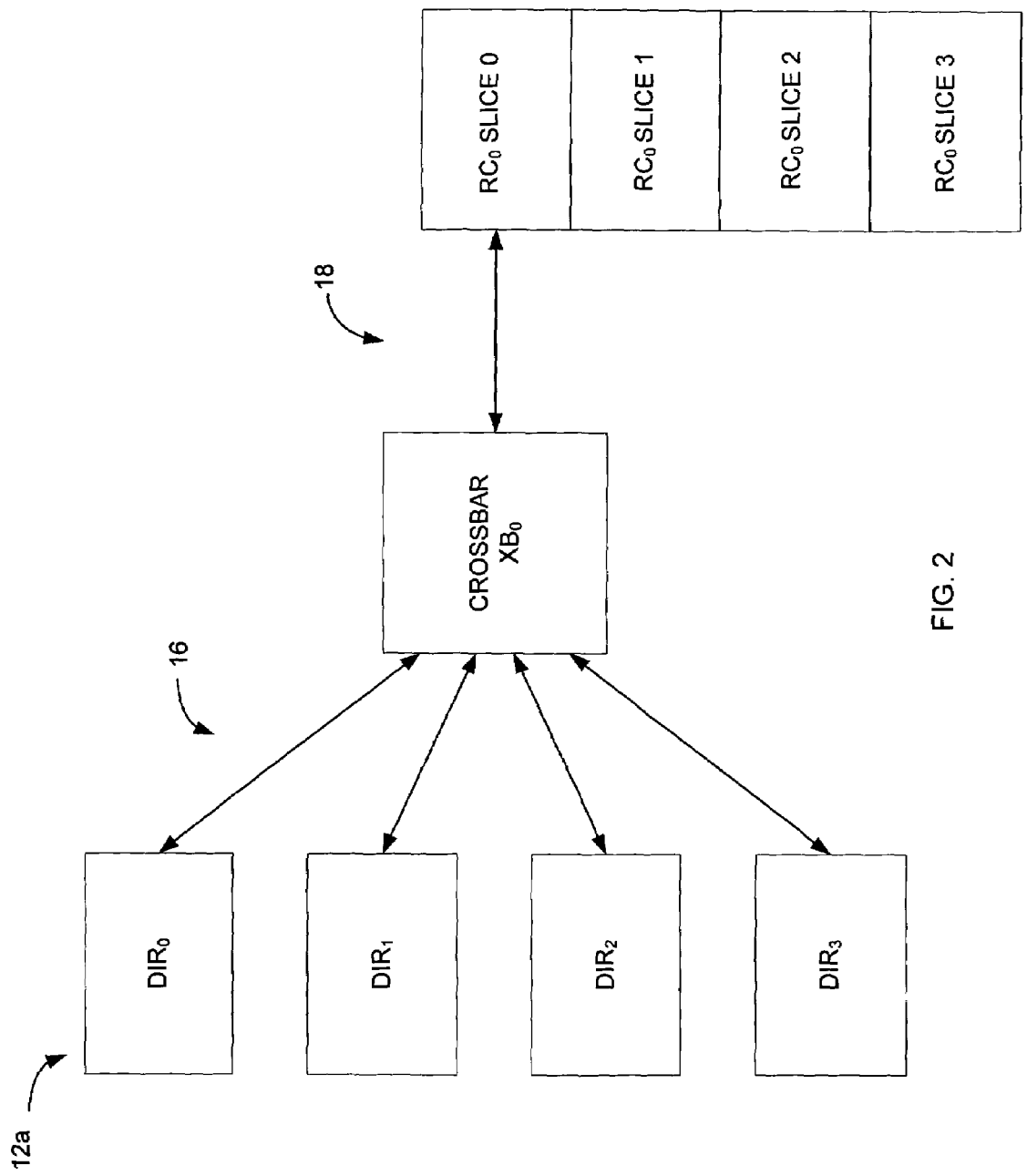
FIG. 2 is a more detailed block diagram showing the relationship between one set of directors and different slices of the associated region controller in accordance with the present invention.

FIG. 2 is a more detailed block diagram of a portion of FIG. 1, showing the connection between one group of directors $DIR_0$-$DIR_3$ and the region controller $RC_0$ through crossbar $XB_0$. In the data command transmission system 10 of the present invention, each region controller RC includes four slices, with each slice being coupled to one group of directors through a single crossbar. Therefore, as shown in FIG. 2, the directors of group 12a, FIG. 1, i.e., directors $DIR_0$-$DIR_3$, are coupled to SLICE 0 of region controller $RC_0$ through crossbar $XB_0$. Although not shown, director group 12b is coupled to $RC_0$ SLICE 1 through crossbar $XB_1$; director group 12b is coupled to $RC_0$ SLICE 2 through crossbar $XB_2$; and director group 12d is coupled to $RC_0$ SLICE 3 through crossbar $XB_3$. While the operation of region controller slice $RC_0$SLICE 0 is specifically described herein, it will be understood that region controller slices $RC_0$ SLICE 0-$RC_0$ SLICE 3 operate in a similar manner.

Figure 3:
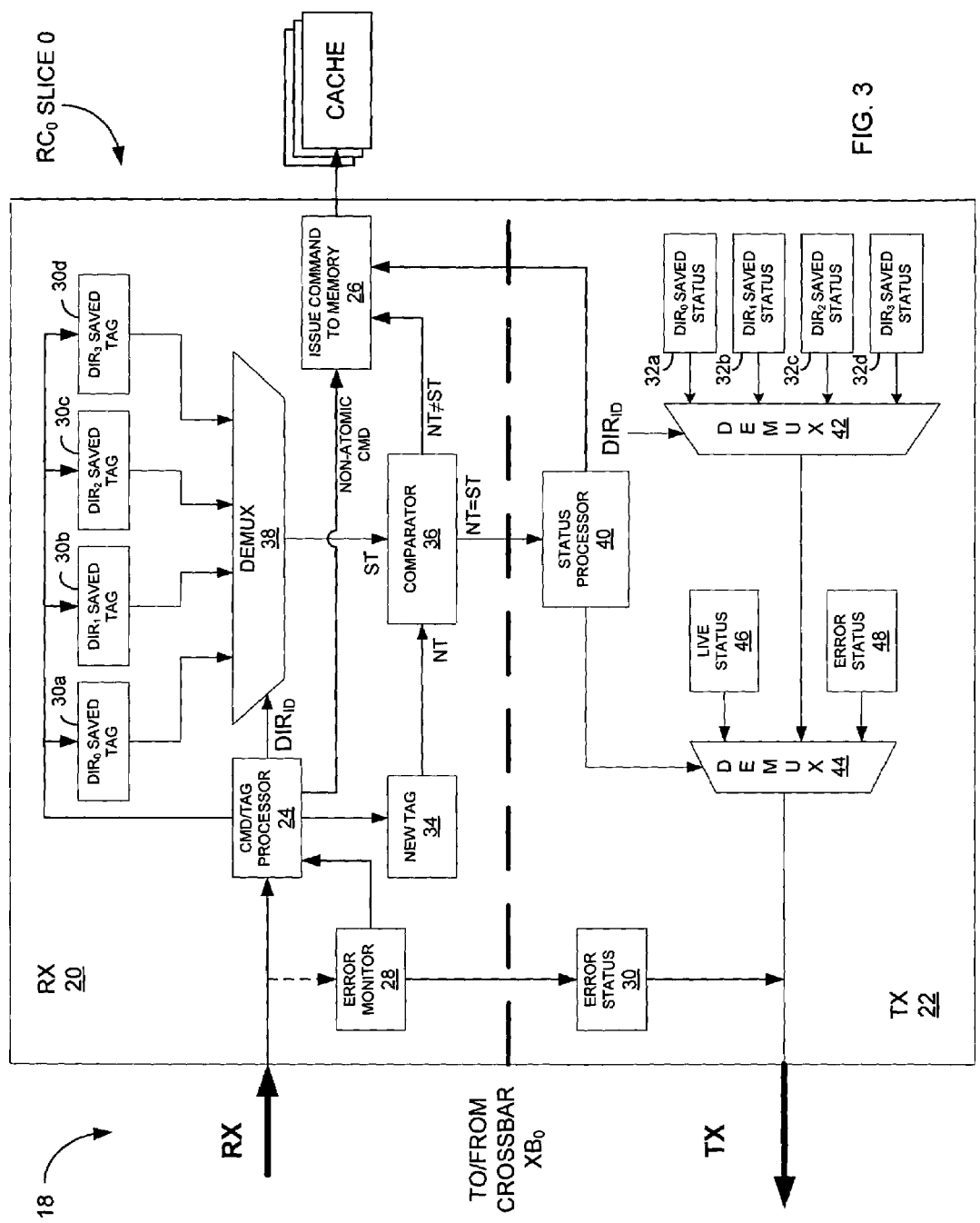
FIG. 3 is a schematic block diagram of the region controller in accordance with the present invention.

FIG. 3 is a functional block diagram of SLICE 0 of the region controller $RC_0$ of the system. As shown in FIG. 3, region controller slice $RC_0$ SLICE 0 receives data transfer commands on receive channel RX of link 18. Each data transfer command received by the region controller slice $RC_0$ SLICE 0 is a packet which includes a tag that includes identification information about that packet. The identification information includes the type of the data transfer command, i.e., read command, write command or read-modify-write command, referred to hereinafter as an "atomic" command. The tag also identifies the particular transfer and identifies the director that initiated the transfer. The specific method of providing such tags with data transfer commands is known in the art and will not be further described herein.

Upon receiving a data transfer command, a command/tag processor 24 checks the tag associated with the command and determines the type of the command. If the command is a non-atomic command, i.e., either a read command or a write command, command processor 24 outputs an instruction to issue the command to the memory 26, and the data transfer command is forwarded to the cache for processing.

Region controller slice $RC_0$ SLICE 0 also includes a data transfer command error monitor 28 that monitors each data transfer command packet as it is processed by the region controller. If, either when the data transfer command packet arrives at the region controller or during the processing of the data transfer command packet by the region controller, the error monitor 28 detects an error in the packet, it notifies the director that sent the packet that an error in the data transfer has occurred by sending a error status 30 to the director over transmit channel TX of link 18. This error status notification will instruct the director to retry the data transfer command. Error monitor 28 also notifies command/tag processor 24 that an error has occurred. Upon receiving an error notification from the error monitor 28, command/tag processor 24 saves the tag of the data transfer command having the error in one of saved tag buffers 30a-30d. Each saved tag buffer 30a-30d is associated with one of the directors in director group 12a. For example, saved tag buffer 30a stores data transfer command tags input from command/tag processor 24 that were sent from director $DIR_0$. Saved tag buffers 30b, 30c and 30d store data transfer command tags from directors $DIR_1$, $DIR_2$, and $DIR_3$, respectively.

Upon notifying the command/tag processor 24 that an error in a data transfer command has occurred, such that the command/tag processor 24 saves the tag of the data transfer command in the appropriate saved tag buffer, 30a-30d, the error monitor 28 also determines the status of the data transfer command when the error occurred. In the system 10 of the present invention, errors detected by the error monitor 28 of region controller can occur before the data transfer has begun execution, after the data transfer has completed execution, and during the execution of the data transfer, i.e., after the data transfer has begun, but before it has completed. The error monitor 28 inputs the status of the command in which an error has occurred to one of saved status buffers 32a-32d of TX portion 22 of region controller RC. Each saved status buffer 32a-32d is associated with one of the directors. For example, saved status buffer 32a stores the data transfer command status input from error monitor 28 for data transfer commands that were sent from director $DIR_0$. Saved status buffers 32b, 32c and 32d store the data transfer command status from directors $DIR_1$, $DIR_2$, and $DIR_3$, respectively.

The following description assumes that, as described above, for a particular data transfer command, error monitor 28 detected an error and transmitted an error status 30 to the director that send the particular data transfer command to the region controller RC. The error monitor 28 causes the command/tag processor 24 to save the tag from the particular data transfer command in the saved tag buffer associated with the director that sent the particular data transfer command. The error monitor 28 also determines the status of the particular data transfer command and stores it in the saved status buffer associated with the director that sent the particular data transfer command. As described above, since the error monitor 28 notified the director that an error occurred in one of the data transfer commands that it sent, it also instructed it to retry the command.

When the region controller slice $RC_0$ SLICE 0 receives a further data transfer command over link 18, the command/tag processor 24 reads the tag of the data transfer command and determines whether the command is an atomic command or a non-atomic command. If it is an atomic command, the command/tag processor inputs the new tag 34 into a comparator 36. The command/tag processor 24, based on the director identified in the tag of the further data transfer command, instructs demultiplexer 38 to transmit the tag saved in the saved tag buffer associated with the director identified in the tag of the further data transfer command. As shown in FIG. 2, the saved tag ST is compared to the new tag NT in comparator 36. If the new tag NT is different from the saved tag ST, meaning that the further command is not a retry of the particular command, the region controller issues, 26, the data transfer command to the memory, and a normal transfer status is returned to the director to notify the director that the data transfer command executed normally.

If the new tag NT is the same as the saved tag ST, meaning that the further command is the retry of the particular command, a data transfer command status processor 40 of the region controller slice $RC_0$ SLICE 0 determines the status of the operation of the data transfer command when the error occurred. The status is ascertained in order to determine how the retry command will be handled. Status processor 40 determines the status of the data transfer by reading the contents of the saved status buffer 32 associated with the director that sent the further command. Based on the status read from the saved status buffer, the status processor 40 determines whether the further command will be issued to the memory and instructs the demultiplexer 44 to output a status of the command to the director from which the command was sent.

As set forth above, an error in a data transfer command can occur and be detected by the error monitor 28 before the execution of the data transfer associated with the command begins, after the execution of the data transfer has completed or during the execution of the data transfer. In the case that the error in the particular data transfer command was detected before the execution of the data transfer began, the status processor 40 of the region controller will read this status from the appropriate saved status buffer 32, issue the further data transfer command to the memory and instruct demultiplexer 44 to output a live status signal 46 to the director from which the further data transfer command was sent, which notifies the director that the command is being executed based on the transmission of the further command. The status processor will then save the status of the execution of the further command in the appropriate saved status buffer 32.

In the case that the error in the particular data transfer command was detected after the execution of the data transfer was completed, the status processor 40 of the region controller will read this status from the appropriate saved status buffer 32. However, the status processor will not issue the further data transfer command to the memory, since the transfer had already been completed. The status processor 40 will then instruct demultiplexer 44 to output the saved status signal stored in buffer 32 to the director from which the further data transfer command was sent.

In the case that the error in the particular data transfer command was detected during the execution of the data transfer, the status processor 40 of the region controller will read this status from the appropriate saved status buffer 32. However, the status processor will not issue the further data transfer command to the memory, since the partial completion of the data transfer of the particular data transfer command could have corrupted the data in the memory, and the reissue of the further data transfer command could cause the data transfer to be operated on the corrupted data. The status processor 40 will then instruct demultiplexer 44 to output an error status signal 48 to the director from which the further data transfer command was sent.

Figure 4:
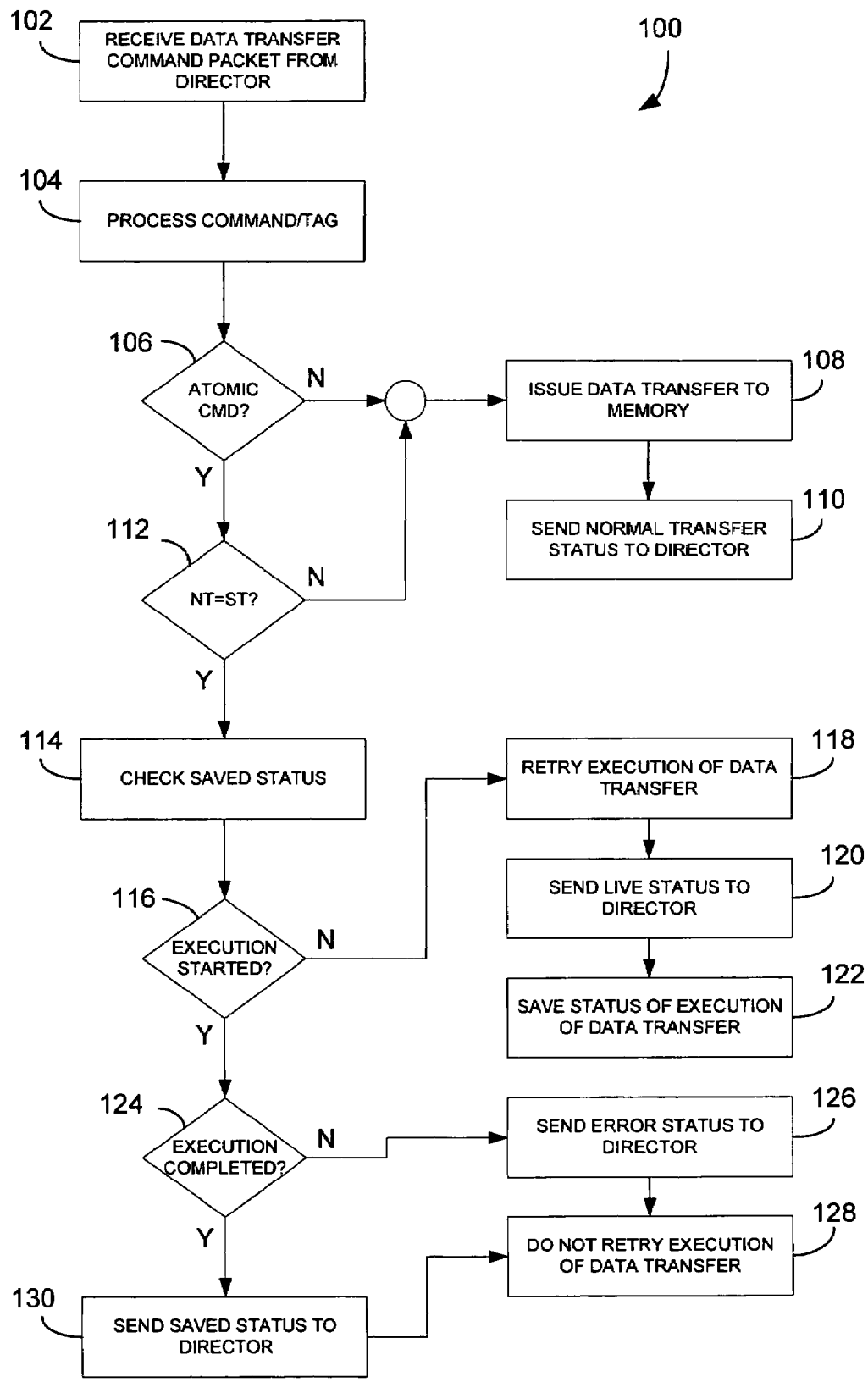
FIG. 4 is a flow diagram showing the steps involved in the atomic data transfer command retry operation in accordance with the present invention.

An example of the operation of the atomic data transfer command retry system of region controller slice $RC_0$ SLICE 0 will be described with reference to the flow diagram 100 of FIG. 4. While not shown in FIG. 4, as set forth above, error monitor 28 continuously monitors the data transfer commands that are received by the region controller slice $RC_0$ SLICE 0. The following description assumes that an error has been detected in a previous data transfer command from director $DIR_0$, the error monitor notified the director $DIR_0$ by sending an error status message 30, instructed the command/tag processor 24 to store the tag of the command in the saved tag buffer 30a and saved the status of the command in the saved status buffer 32a of director $DIR_0$. Since the director $DIR_0$ received the error status message 30 from the error monitor 24, it will retry the data transfer command. At Step 102, a new data transfer command packet is received by the region controller slice $RC_0$ SLICE 0. For the purposes of this example, the new data transfer command packet is received from the director $DIR_0$. The command/tag processor 24 receives the command and determines, based on the tag, what type of command it is and which director sent it, Step 104. If the command was not an atomic command, i.e., it is either a read command or write command, Step 106, the command/tag processor would issue the command to the memory, Step 108 and send a normal transfer status to the director that sent the command, to notify the director that the command was executed normally, Step 110.

However, in Step 106, the command/tag processor 28 determines that the command is an atomic command. Therefore, the command/tag processor 24 inputs the tag 34 of the new command to the comparator 36 and, based on the ID of the director associated with the newly-received tag, instructs the demultiplexer 38 to output the contents of saved tag buffer 32a. The new tag NT and the saved tag ST are compared in comparator 38, Step 112. If the new tag and the saved tag were not the same, meaning that the new tag is not associated with a retry of the command originally identified by the saved tag, the region controller would issue the data transfer command associated with the new tag to the memory, Step 108, and send a normal transfer status to the director $DIR_0$. However, because the new tag is associated with the retry of the original command identified by the saved tag, the comparator determines that the new tag is associated with a command that is a retry of the original command. Before proceeding with the execution of the command, the status processor 40 checks the saved status of the command to determine when during the execution of the command, the error occurred, Step 114. If the saved status stored in buffer 32a indicates that the error occurred in the command before the execution of the command began, Step 116, the region controller will retry the execution of the data transfer command, Step 118. The status processor 40 will then instruct the demultiplexer 44 to output a live status message 46 to the director $DIR_0$ to notify the director that the execution of the retry command has occurred, Step 120. The status processor then writes to saved status buffer 32a an indication that the retry command has been executed, Step 122.

If, in Step 116, the status processor determines that the execution of the original command had begun, but not completed, Step 124, the status processor 40 instructs demultiplexer 44 to output an error status message 48 to the director $DIR_0$, to notify the director that the execution of the retry command has failed, Step 126. The command is not retried, Step 128, since the partial completion of the data transfer of the particular data transfer command could have corrupted the data in the memory, and the retry of the further data transfer command could cause the data transfer to be operated on the corrupted data.

If, in Step 124, the status processor determines that the execution of the original command had been completed, the status processor 40 will then instruct the demultiplexer 44 to output the saved status message stored in buffer 32a to the director $DIR_0$ to notify the director that the execution of the original command has occurred, Step 130. The command is not retried, Step 128, since the execution of the original command had completed prior to the error.

Accordingly, the present invention enables the data command transmission system 10 to retry not only non-atomic commands, but also atomic commands. Therefore, if a command issued by a director of the system were to fail before being completed, a retry of the command is able to be attempted, regardless of the type of the original, failed command.

The system and method described herein may find applicability in any computing or processing environment. The system and method may be implemented in hardware, software, or a combination of the two. For example, the system and method may be implemented using circuitry, such as one or more of programmable logic (e.g., an ASIC), logic gates, a processor, and a memory. While the invention is described in connection with a data storage system, it may be utilized in any circuit switched network incorporating a serial interface.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A data transfer retry method comprising:
   A. receiving a particular atomic data transfer command from a director;
   B. processing identification information associated with the particular atomic data transfer command;
   C. comparing the identification information associated with the particular atomic data transfer command to identification information of a previous atomic data transfer command received from the director;
   D. determining that the particular atomic data transfer command is a retry command of the previous atomic data transfer command received from the director;
   E. determining a status of the execution of the previous atomic data transfer command received from the director; and
   F. processing the particular atomic data transfer command based on the status of the execution of the previous atomic data transfer command determined in Step E.

2. The method of claim 1 wherein, in Step E, if the status of the execution is determined to be that the previous atomic data transfer command never began, in Step F, the particular atomic data transfer command is issued to memory.

3. The method of claim 2 further comprising sending a status to the director indicating that the particular atomic data transfer command has been executed.

4. The method of claim 3 further comprising saving the status of the particular atomic data transfer command.

5. The method of claim 1 wherein, in Step E, if the status of the execution is determined to be that the previous atomic data transfer command began, but was not completed, in Step F, the particular atomic data transfer command is not issued to memory.

6. The method of claim 5 further comprising sending an error status to the director indicating that the particular atomic data transfer command has not been executed.

7. The method of claim 1 wherein, in Step E, if the status of the execution is determined to be that the previous atomic data transfer command was completed, in Step F, the particular atomic data transfer command is not issued to memory.

8. The method of claim 7 further comprising sending a status to the director indicating that the particular atomic data transfer command has been executed.

9. A data transfer retry system comprising:
   a data transfer command receiver for receiving data transfer commands, the commands including identification tags, the data transfer command controller including:
   a tag director identifier for identifying a director that issued a particular data transfer command;
   a number of storage buffers, each storing a saved tag of a data transfer command issued by a particular director;
   a comparator for comparing a saved tag stored in one of the buffers to a new tag received by the tag processor from the same director that issued the saved tag, wherein, if the saved tag is the same as the new tag, the command associated with the new tag is determined to be a retry of the command associated with the saved tag.

10. The system of claim 9 wherein the data transfer command controller further includes a status processor for determining the status of the command associated with the saved tag to determine an action that will be carried out with the retry command associated with the new tag.

11. The system of claim 10 wherein, if the status processor determines that the execution of the command associated with the saved tag was not started, the command associated with the new tag is issued to memory.

12. The system of claim 10 wherein, if the status processor determines that the execution of the command associated with the saved tag was started, but not completed, the command associated with the new tag is not issued to memory.

13. The system of claim 10 wherein, if the status processor determines that the execution of the command associated with the saved tag was completed, the command associated with the new tag is not issued to memory.

14. The system of claim 11 wherein the status processor sends a status to the director indicating that the command associated with the new tag has been executed.

15. The system of claim 12 wherein the status processor sends an error status to the director indicating that the command associated with the new tag has not been executed.

16. The system of claim 13 wherein the status processor sends a status to the director indicating that the command associated with the saved tag has been executed.

* * * * *